United States Patent
Bruck et al.

(10) Patent No.: US 11,294,119 B1
(45) Date of Patent: Apr. 5, 2022

(54) MULTIMODE-INTERFERENCE WAVEGUIDE CROSSINGS

(71) Applicant: Cisco Technology, Inc., San Jose, CA (US)

(72) Inventors: Roman Bruck, Vienna (AT); Attila Mekis, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/952,992

(22) Filed: Nov. 19, 2020

(51) Int. Cl.
    *G02B 6/26* (2006.01)
    *G02B 6/12* (2006.01)
    *G02B 6/293* (2006.01)

(52) U.S. Cl.
    CPC ...... *G02B 6/12007* (2013.01); *G02B 6/29344* (2013.01)

(58) Field of Classification Search
    CPC .......... G02B 6/12007; G02B 6/29344
    See application file for complete search history.

(56) References Cited

U.S. PATENT DOCUMENTS

| | | | |
|---|---|---|---|
| 5,706,377 A * | 1/1998 | Li | G02B 6/12016 385/14 |
| 6,141,152 A * | 10/2000 | Trouchet | G02B 6/12011 359/634 |
| 7,058,259 B2 | 6/2006 | Stuart | |
| 7,899,280 B2 | 3/2011 | Little | |
| 8,649,643 B2 | 2/2014 | Jeong | |
| 9,020,367 B2 | 4/2015 | Jones et al. | |
| 9,366,820 B2 | 6/2016 | Konishi et al. | |
| 2003/0210858 A1* | 11/2003 | Kaneko | G02B 6/12014 385/24 |

FOREIGN PATENT DOCUMENTS

CN          106324865 A          1/2017

\* cited by examiner

*Primary Examiner* — Ellen E Kim
(74) *Attorney, Agent, or Firm* — Patterson + Sheridan, LLP (57) ABSTRACT

Embodiments include a multimode interference (MMI) device with offset facets. The MMI device includes a first set of facets positioned on opposite edges of the MMI device with an optical path between the set of facets. The MMI device also includes a second set of facets positioned on opposite edges of the MMI device, where the second set of facets are offset from the first set of facets, where a second optical path passes through the MMI device between the second set of facets.

20 Claims, 6 Drawing Sheets

MULTIMODE-INTERFERENCE WAVEGUIDE CROSSINGS

TECHNICAL FIELD

Embodiments presented in this disclosure generally relate to integrated optical devices with waveguides providing optical signal routing. More specifically, embodiments disclosed herein are related to providing multi-mode single layer waveguide crossings in optical devices.

BACKGROUND

Integrated optics, such as optical devices and photonic circuit devices, combine several different types of optical or photonic devices in order to provide complex functions via the integrated optics. Waveguide crossings provide the complex functions in the integrated optics serving as optical signal routing among and between various integrated optical components on an integrated optical device. Unlike electronic circuits, which rely on multiple layers for power and signal routing, most integrated optic platforms/devices are limited to a single photonic layer for routing waveguides and optical devices. Some multi-layer integrated optic devices exist.

Furthermore, in order to handle an ever-increasing demand in throughput, optical telecommunication standards include wavelength division multiplexing (WDM), which increases photonic routing complexity as signals of different wavelengths are routed on a single photonic chip. The most successful approach to single layer waveguide crossings is based on multimode interference (MMI) devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One example embodiment includes a multimode interference (MMI) device. The MMI device includes a first start facet on a first edge of the MMI device, a first end facet on a second edge of the MMI device, and a first optical path through the MMI device from the first start facet to the first end facet. The MMI device also includes a second start facet on the first edge, where the second start facet is offset from the first start facet on the first edge, a second end facet on the second edge, where the second end facet is offset from the first end facet on the second edge, and a second optical path through the MMI device from the second start facet to the second end facet.

Another example embodiment includes a photonic circuit device with a multimode inference (MMI) waveguide crossing. The photonic circuit device includes a first waveguide which transmits a first optical signal with a first transmission wavelength, a second waveguide which a second optical signal with a second transmission wavelength different than the first transmission wavelength. A waveguide crossing MMI device on the photonic circuit device for the first waveguide and the second waveguide may include: a first start facet optically connected to the first waveguide on a first edge of the waveguide crossing MMI device and a first end facet on a second edge of the waveguide crossing MMI device. The waveguide crossing MMI device may also include a first optical path through the waveguide crossing MMI device from the first start facet to the first end facet for the first optical signal. The waveguide crossing MMI device also includes a second start facet optically connected to the second waveguide on the first edge, where the second start facet is offset from the first start facet on the first edge, a second end facet on the second edge, where the second end facet is offset from the first end facet on the second edge, and a second optical path through the waveguide crossing MMI device from the second start facet to the second end facet for the second optical signal.

Another example embodiment includes a multimode interference (MMI) device. The MMI device includes a first start facet on a first edge of the MMI device, a first end facet on a second edge of the MMI device, a second start facet on the first edge, a second end facet on the second edge, a third start facet on a third edge of the MMI device, a third end facet on a fourth edge of the MMI device, a fourth start facet on the third edge, and a fourth end facet on the fourth edge. The MMI device also includes a first optical path through the MMI device from the first start facet to the first end facet. The MMI device also includes a second optical path through the MMI device from the second start facet to the second end facet. The MMI device may also include a third optical path through the MMI device from the third start facet to the third end facet. The MMI device may also include a fourth optical path through the MMI device from the fourth start facet to the fourth end facet.

Example Embodiments

Waveguide crossings are used in integrated optics in order to provide complex routing and optical function utilization in an integrated optical or photonic device. Without waveguide crossings, only basic signal routing is possible in integrated optical devices. Adding additional routing layers to an integrated optical device is usually not feasible or adds prohibitive complexity to the creation of the device due to the fabrication methods utilized in the generation of optical devices. In order to enable all but the most basic routing topologies and optical functions without adding routing layers to photonic devices, efficient waveguide crossings are needed in the single photonic layer. The most successful approach to single layer waveguide crossings is based on multimode interference (MMI) devices. In some examples, multimode interference (MMI) devices are used to provide some limited types of waveguide crossings; however, these MMI devices typically provide limited scope in the types of signals to which they can provide efficient waveguide crossing (e.g., single channel/limited bandwidth crossings, etc.). Therefore, using traditional MMI devices for multiple optical wavelength channels and wavelengths incurs performance degradation in the form of additional loss, crosstalk, and reflectivity in the MMI waveguide crossings.

For example, in a rectangular 2×2 MMIs (i.e., MMI device with two input ports and two output ports), two input waveguides launch light at a front facet of the MMI into a rectangular MMI region within the MMI device to create dual optical paths through the MMI region. In some examples, a limiting factor of rectangular 2×2 MMI design is due to the rectangular shape of the MMI region as the rectangular geometry enforces a same design wavelength for both paths in the MMI region. Providing efficient multi-channel, multi-mode, single plane waveguide crossings in optical devices remains a challenge.

The various example MMI devices described herein deviate from the rectangular shape for the MMI region. In some examples, parts of the front and end facets of the MMI device are shifted or offset from each other in order to alter the design wavelength for optical signals in the optical paths through the MMI device. These deviations/offsets allow for optical signals of various wavelengths or optical channels to be crossed in a single MMI device as described herein. Various examples of 2×2 MMIs as well as larger port number MMIs are described in relation to FIGS. 1-5.

Figure 1:
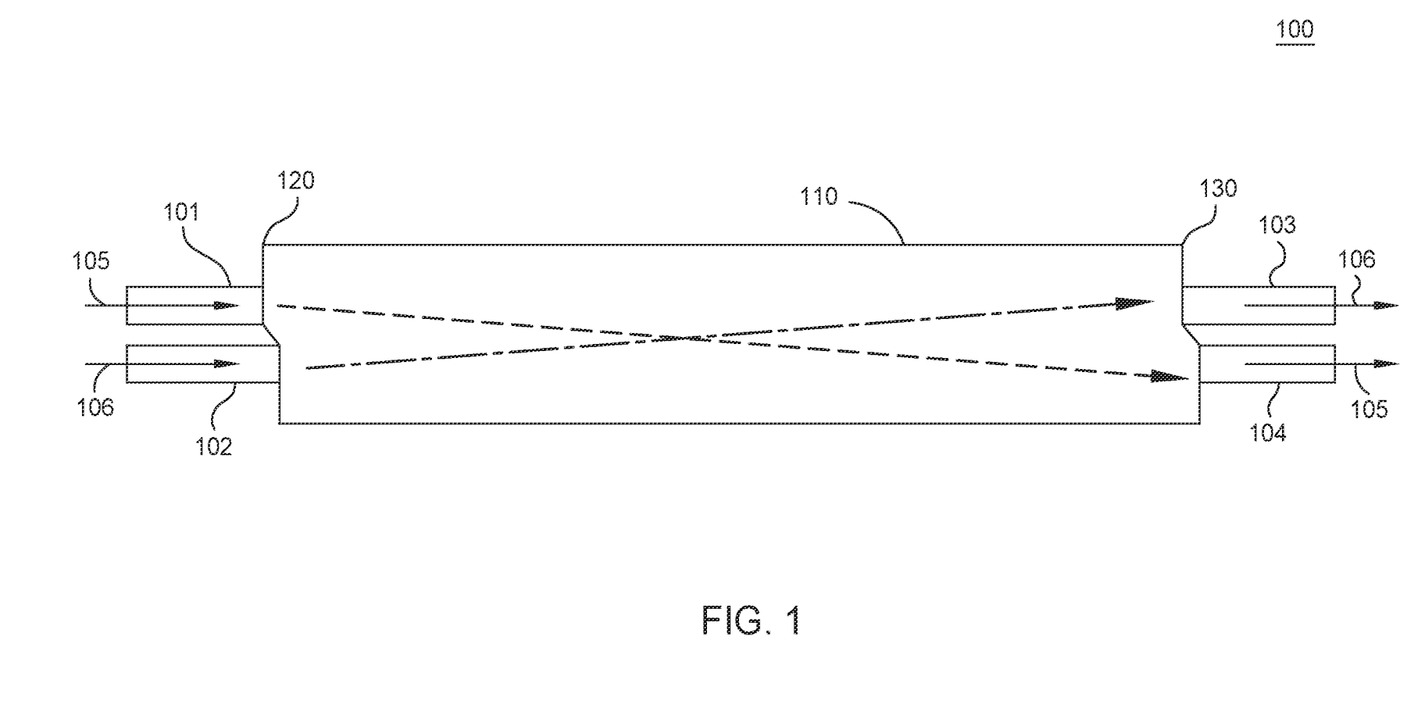
FIG. 1 illustrates a photonic device, according to one embodiment.

FIG. 1 illustrates a photonic device 100, according to one embodiment. The photonic device 100 includes multiple waveguides providing optical paths for optical signals through the photonic device 100. The multiple waveguides include waveguides 101, 102, 103, and 104. The waveguides 101 and 104 carry/transmit optical signal 105 and the waveguides 102 and 103 carry/transmit the optical signal 106. In some examples, the optical signals 105 and 106 have different wavelengths such that the optical signals cannot be crossed without an additional crossing mechanism.

For example, attempting to provide a waveguide crossing for optical signals of different wavelengths with a rectangular 2×2 MMI device would be difficult due to interference and loss within the MMI device of the different signals. In a rectangular MMI device the two input waveguides, e.g., the waveguides 101 and 102, are approximately positioned and optically coupled in the center of their respective halves of a front facet (e.g. edge 120) of the MMI device. Two output waveguides, e.g., waveguides 103 and 104 at the end facet (e.g. edge 130) at the same lateral positions, collect the light transmitted through the MMI region. In some examples of a 2×2 MMI, the light is transported to the diagonal output (e.g. waveguide 101 to waveguide 104). In some examples, MMI devices utilize self-imaging, where a light image at a start facet will be mirrored to the end facet of the MMI device. The incoming light excites a set of modes and each mode propagates through the MMI region of the MMI device individually.

To provide the correct propagation patterns within the waveguide crossing device 110, an MMI width and MMI length are adjusted to the desired wavelength. In an MMI region, the two light paths cross without mutual interference and with minimal signal loss. In some examples, a limiting factor of MMI design with a rectangular shape of the MMI is that it enforces a same design wavelength for both paths in the MMI such that the optical signals 105 and 106 must have a same wavelength or channel, or else incur high loss.

In order to provide a waveguide crossing for signals with different wavelengths, the photonic device 100 includes waveguide crossing device 110 which provides a multi-mode planar waveguide crossing without adding additional optical routing layers in photonic device 100. For example, the waveguide crossing device 110 provides an optical path for an optical signal 105 between the waveguide 101 and the waveguide 104. The waveguide crossing device 110 also provides an optical path for the optical signal 106 between waveguides 102 and 103, where the optical signal 105 and 106 may be optical signals having different wavelengths and optical channel properties.

In some examples, the waveguide crossing device 110 is a non-rectangular MMI device where the geometric properties of the waveguide crossing device 110, especially geometric alterations on the edges 120 and 130, allows for multi-channel or multi-wavelength waveguide crossings. The geometry of the waveguide crossing device 110 and the waveguide signal crossing within the waveguide crossing device 110 are described in further detail in relation to FIGS. 2A-C.

Figure 2A:
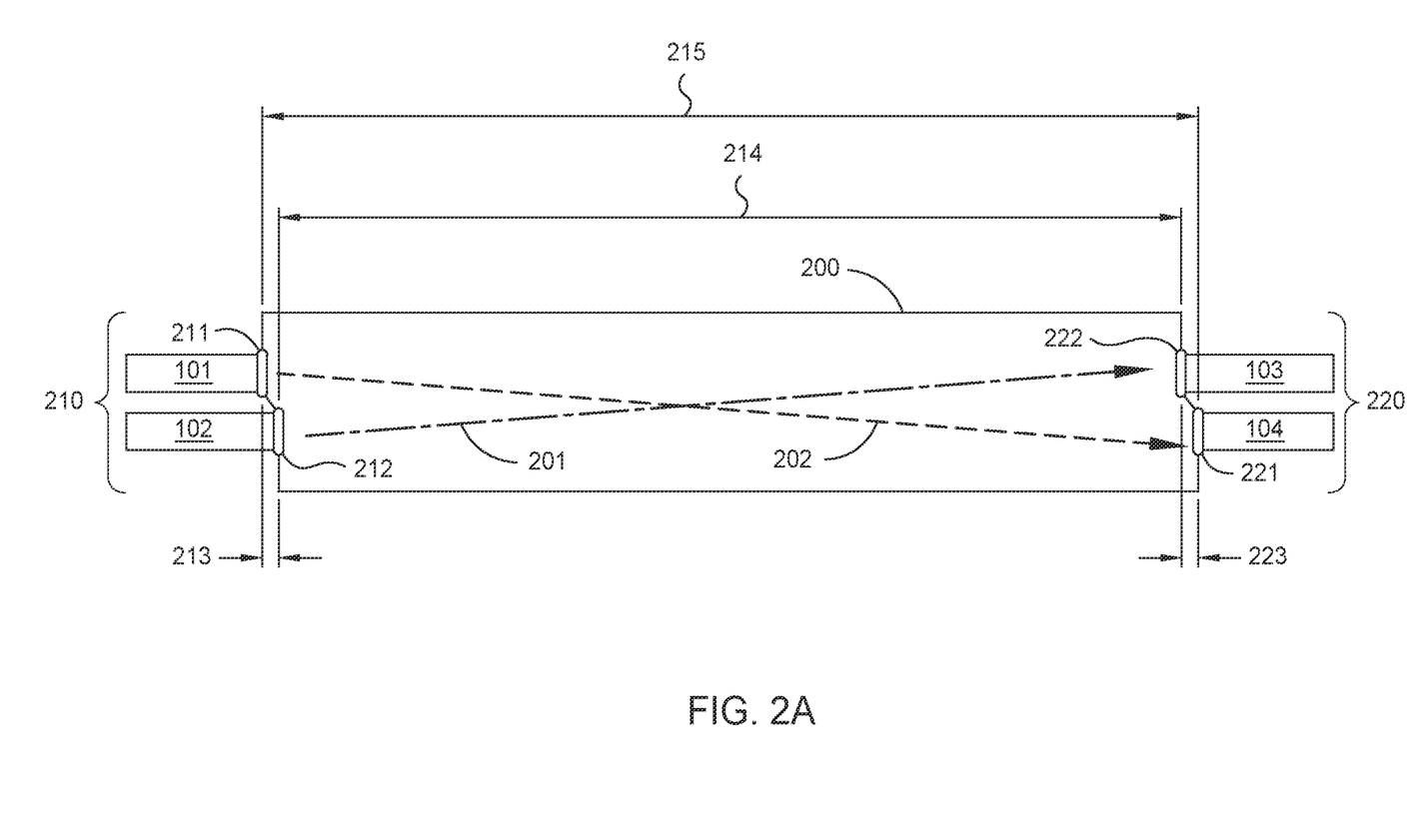
FIG. 2A illustrates a multimode interference (MMI) device, according to one embodiment.

FIG. 2A illustrates an MMI device 200, according to one embodiment. In some examples, the MMI device is embodied as the waveguide crossing device 110 shown in FIG. 1. The MMI device 200 provides a first optical path, optical path 202, between waveguides 101 and 104. The MMI device 200 also provides a second optical path, optical path 201, between waveguides 102 and 103. In some examples, the optical path 202 carries optical signal 105 as shown in FIG. 1, where the optical signal 105 transmits an optical signal with a first transmission wavelength (e.g., a wavelength of a signal transmitted or transmitting through the waveguide is 1270 nm). In some examples, the optical path 201 carries the optical signal 106, where the optical signal 106 transmits an optical signal with a second transmission wavelength (e.g., a wavelength of a signal transmitted through the waveguide is 1310 nm). The optical paths 201 and 202 cross or otherwise overlap within the MMI device 200 and in turn provide a waveguide and optical signal crossing for the waveguides connected to the MMI device 200.

The optical path 202 begins at a first start facet, facet 211 and transmits/propagates through the MMI device 200 to a first end facet, facet 221. The waveguide 101 may be optically coupled to the facet 211 via a port in the MMI or other type of optical coupling mechanism to transmit light energy from the optical signal 105 to the MMI device 200 and optical path 202. While depicted as a straight line in FIG. 2A, the optical path 202 includes a propagation pattern of light energy throughout portions of the MMI device 200 as shown in further detail in FIG. 2B.

The optical path 201 begins at a second start facet, facet 212 and transmits/propagates through the MMI device 200 to a second end facet, facet 222. The waveguide 102 may be optically coupled to the facet 212 via a port in the MMI or other type of optical coupling mechanism to transmit light energy from the optical signal 106 to the MMI device 200 and optical path 201. While depicted as a straight line in FIG. 2A, the optical path 201 also includes a propagation pattern of light energy throughout portions of the MMI device 200 as shown in further detail in FIG. 2C. In some examples, the optical loss is minimized in the optical path 201 for an optical signal at a first wavelength, while the optical loss in the optical path 202 is minimized for an optical signal at a second wavelength, which allows for the MMI device 200 to carry optical signals with differing wavelengths.

As discussed above, the MMI device 200 is a non-rectangular MMI device. The non-rectangular geometry is provided, in part, by the changed positions of facets on each lateral end of the MMI device 200. For example, by adjusting the bottom-half front facet, facet 212, and the top-half end facet, facet 222, inwards (e.g., into the MMI region), one diagonal optical path, optical path 201 is shortened. This non-rectangular geometry creates two different diagonal path lengths associated with distances 214 and 215 thus adjusting the design wavelength for each of the optical paths individually.

In some examples, the facet 211 and the facet 212 are located on a first edge of the MMI device 200, edge 210. In some examples, the facet 211 is offset from the facet 212 on the edge 210 by at least an offset distance 213. Additionally, in some examples, the facet 221 and the facet 222 are located on a second edge of the MMI device 200, edge 220. In some examples, the facet 221 is offset from the facet 222 on the edge 220 by at least an offset distance 223. In some examples, the offset distance 213 and the offset distance 223 (alone or in combination together) offset the geometry of the MMI device 200 such that optical signals with different transmission wavelengths may be transmitted through the MMI without large amounts of signal loss.

In some examples, any change in the shape of a MMI region within the MMI device 200 impacts the transmission channels in the MMI. However, the offset facets described in one path may also have little to no impact on the other path. For instance, when light is injected from a waveguide 101 into the MMI device 200, the light begins to fan out or disperse into a propagation pattern. However, the light propagation takes a certain distance for any light energy from the waveguide 101 to reach the bottom half of the MMI device 200. Within this distance, the bottom half facet, facet 212, may be moved or adjusted (on the order of one micrometer) without interfering with light propagation of the optical path 202, as there is no optical or light energy present that may interact with the changed geometry (as also described in more detail in relation to FIGS. 2B-C). In some examples, a shift in the position of the offset facet to adjust for a different optical channels/wavelengths is typically smaller than the distance the injected light needs to reach the other half of the MMI device 200.

Figure 2B:
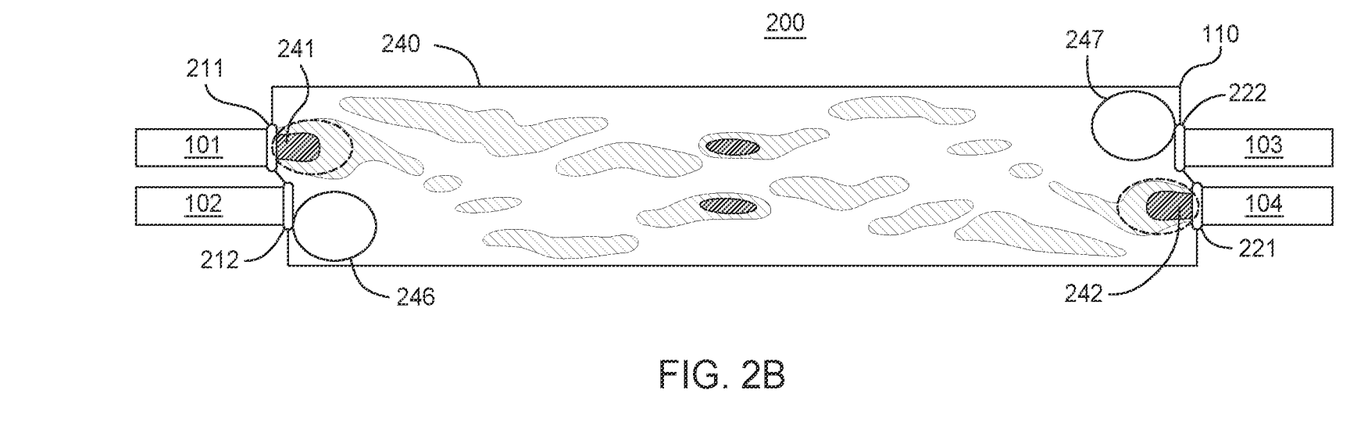
FIGS. 2B-C illustrate propagation patterns through an MMI device, according to embodiments.

For example, a distance 215 created by the offset distance 213 between the facet 211 and the facet 221 provides a first distance for the optical path 202, as described in relation to FIG. 2B. In some examples, the distance 215 creates a first propagation pattern between the facets optimized for an optical signal of a first wavelength in the MMI device 200 (e.g., 1270 nanometers (nm)). In some examples, a distance 214 created by the offset distance 213 between the facet 212 and the facet 222 provides a second distance that creates a second propagation pattern between the facets optimized for an optical signal of a second wavelength (e.g., 1310 nm) in the MMI device 200, as described in relation to FIG. 2C. In some examples, the first wavelength and the second wavelength are different wavelengths, with different propagation patterns in each path of the MMI device 200 as described in relation to FIGS. 2B-C.

This concept can also be generalized to MMIs with larger port numbers. MMI waveguide crossings can be realized with three, four, or a higher number of waveguides. By shifting the front and end facets around the respective input and output waveguides, each path can be adjusted for different wavelengths individually as discussed in more detail in relation to FIGS. 3-5.

Figure 2C:
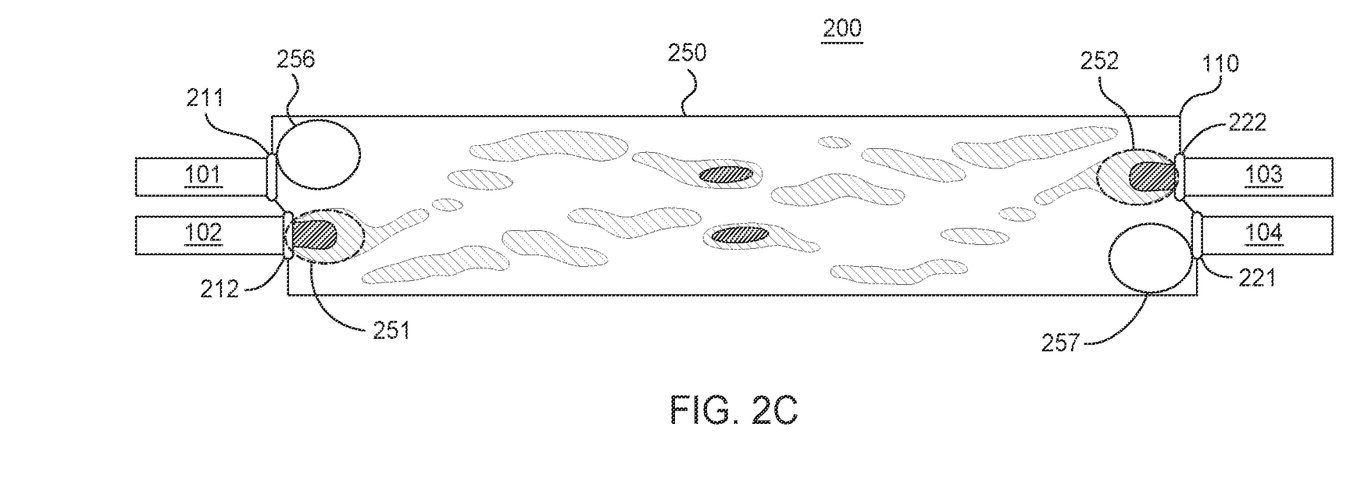

FIG. 2B-C illustrate propagation patterns through an MMI device, according to embodiments. FIG. 2B illustrates pattern 240 for the optical path 202 in the MMI device 200.

In some examples, the optical path 202 disperses in the MMI device 200 as it propagates through the MMI according to the pattern 240. While dispersed within the MMI the pattern 240 includes areas where the optical signal is coupled to waveguides. For example, the pattern 240 includes areas within the MMI device 200 where the light energy for optical path 202 is high. For example, region 241 at the facet 211 and region 242 at the facet 221 are areas of high light energy, where the light energy is coupled to the connected waveguides via the facets.

The pattern 240 also includes areas within MMI device 200 where there is little or no light energy associated with the optical path 202. For example, areas 246 and 247 include no (or little) light energy associated with the optical path 202. The presence of the areas 246 and 247, along with other low or no energy areas in the pattern 240, allow for the geometry of the MMI device 200 to change in these areas without significant signal loss or interference e.g. In the optical paths 201 and 202.

FIG. 2C illustrates pattern 250 for the optical path 201 in the MMI device 200. In some examples, the optical path 201 disperses in the MMI device 200 as it propagates/passes through the MMI device 200 according to the pattern 250. While light energy is dispersed within the MMI device 200, the pattern 250 also includes areas where the light energy is high. For example, the pattern 250 includes areas within the MMI device 200 where the light energy for optical path 201 is high. For example, region 251 at the facet 212 and region 252 at the facet 222 are areas of high light energy, where the light energy is coupled to the connected waveguides via the facets.

The pattern 250 also includes areas within MMI device 200 where there is little or no light energy associated with the optical path 201. The presence of the area 256 and area 257, along with other low or no energy areas in the pattern 250, allow for the geometry of the MMI device 200 to change in these areas without significant signal loss or interference e.g. In the optical paths 201 and 202. In some examples, the geometry of the MMI edges, including the offset distances 213 and 223 in FIG. 2A as well as distances 215 and 214, are determined in order to provide optimal propagation patterns within the MMI device 200 for the optical paths.

The offset distances 213 and 223 can be adjusted within the adjacent areas without light energy, areas 246, 247, 256, and 257 to change the associated patterns in order to optimize the propagation pattern for low optical loss in the optical paths in the MMI device 200. For example, the facet 212 and sub-edge or portion of the edge 210 where the facet 212 is located may be adjusted into or out of the MMI device 200 within the area 246 in order to optimize the pattern 250 in order to provide a pattern for a specific wavelength in the MMI device 200. For example, the facets 212 and 222 may be moved within the areas 246 and 247 to decrease distance 214 without altering pattern 240.

In the examples discussed in FIGS. 2A-C, the MMI device 200 is a 2×2 MMI device where there are two input ports, facets 211 and 212, and two output ports, facets 221 and 222. As described the 2×2 MMI device includes two propagation patterns that allow for the optical signal in the optical paths 202 and 201 to cross without significant signal loss. In some examples, more than two waveguides may be deployed to cross in a single MMI as described in relation to FIGS. 3-5.

Figure 3:
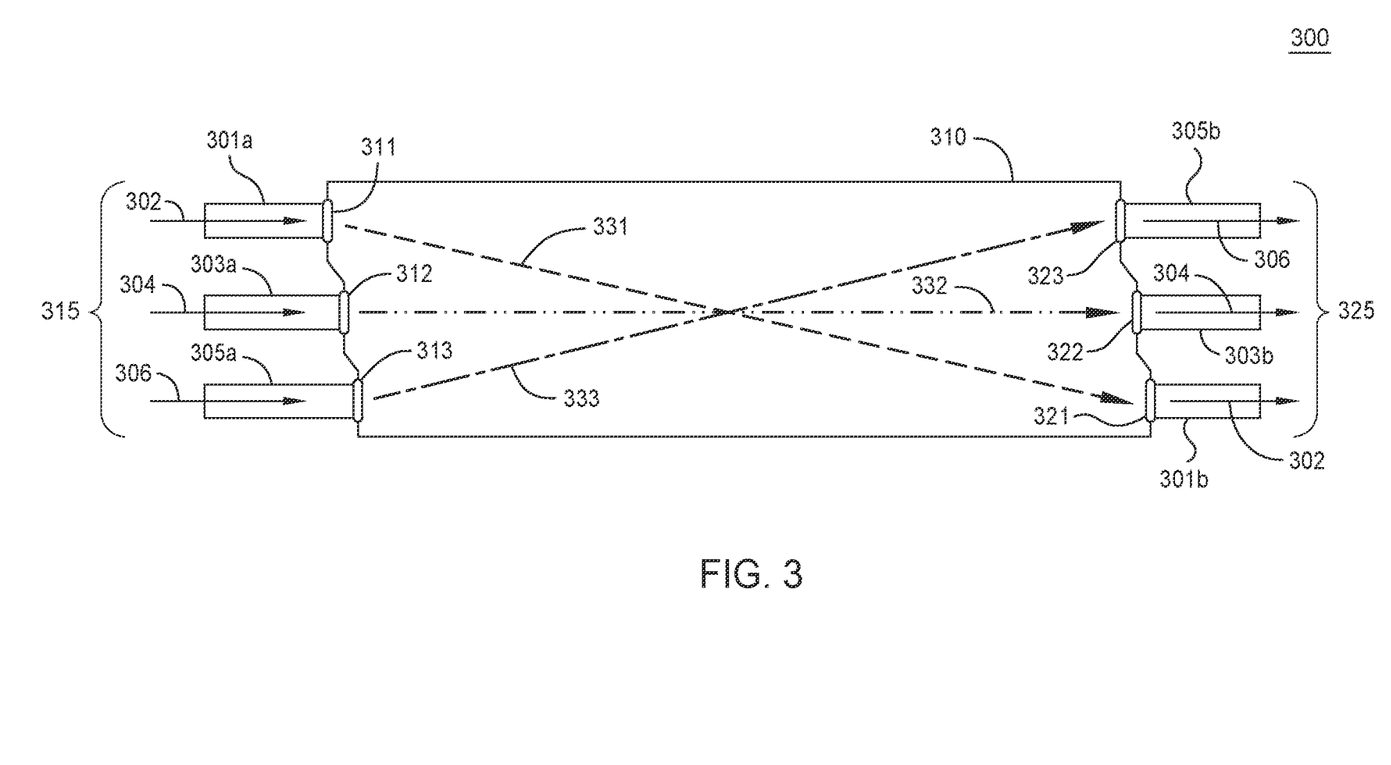
FIG. 3 illustrates a 3×3 MMI device, according to one embodiment.

FIG. 3 illustrates a 3×3 MMI device 310, according to one embodiment. An optical device, device 300, includes waveguides 301a-305b, where an optical signal 302 in waveguide 301a crosses waveguides 303a and 305a to waveguide 301b. Optical signals 304 and 306 also cross the other waveguides to connect from waveguide 303a to 303b and 305a to 305b, respectively. In order to provide waveguide crossing to the waveguides in the device 300, the MMI device 310 is a 3×3 (3 Input port and 3 output port) MMI device. The MMI device 310 includes additional optical paths, such as optical path 331, which connects waveguide 301a to the waveguide 301b, optical path 332, which connects waveguide 303a to the waveguide 303b, and optical path 333, which connects waveguide 305a to the waveguide 305b.

The MMI device 310 includes additional facets in order to connect to the 3 waveguides including additional start facets, facets 311-313 and additional end facets, facets 321-323. In a manner similar to that described in FIGS. 2A-2C, the facets 311-313 are located on an edge 315, and are offset from each other according to various offset distances similar to the offset distance 213. Additionally, the facets 321-323 are located on an edge 325 and are offset from each other according to various offset distances similar to the offset distance 223 which may alter various propagation patterns associated with the optical signals in the MMI device 310.

For example, the optical signals 331-333 each have an associated additional propagation patterns (similar to the propagation patterns, patterns 240 and 250, shown in FIGS. 2B-C), where the various offsets of the facets allow for low-loss propagation of each individual optical signal 331-333, while maintaining low-loss propagation for the other signals in the MMI device. The geometry of the edges 315 and 325 may be adjusted within areas of no light energy associated with the other patterns in order to minimize alterations in the other patterns in the MMI, such that the three optical signals, signals 302-306 may cross within a single optical plane of the device 300. Additional waveguides (e.g., four or more waveguides) may also be crossed such as described in FIG. 4.

Figure 4:
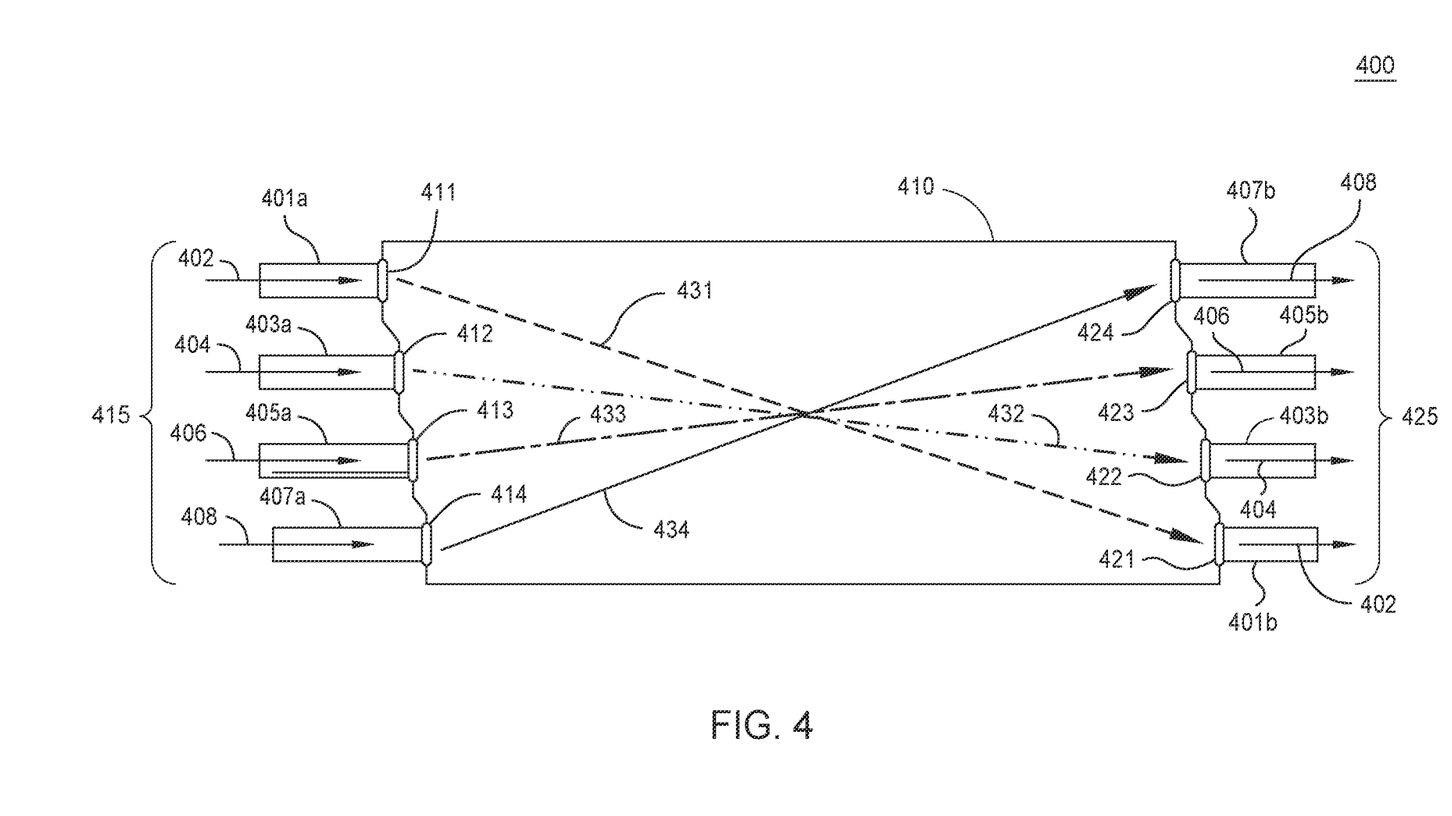
FIG. 4 illustrates a 4×4 MMI device, according to one embodiment.

FIG. 4 illustrates a 4×4 MMI device 410, according to one embodiment. An optical device, device 400 includes at least four waveguides crossing in the device 400. For example, waveguides 401a-407a are to cross each other to waveguides 401b-407b, respectively. The waveguides transmit the optical signals, signals 402-408 for waveguide crossing in the MMI device 410. For example, the optical signal 402 transmitted via the waveguide 401a is crossed to the waveguide 401b via the MMI device 410. The MMI device 410 provides the various waveguide crossings via the optical paths 431-434. For example, MMI device 410 includes optical path 431, which connects waveguide 401a to the waveguide 401b, optical path 432, which connects waveguide 403a to the waveguide 403b, optical path 433, which connects waveguide 405a to the waveguide 405b, and optical path 434, which connects waveguide 407a to the waveguide 405b.

The MMI device 410 includes additional facets in order to connect to the 4 or more waveguides including start facets, facets 411-414, and end facets, facets 421-424. In a manner similar to that described in FIGS. 2A-2C, the facets 411-414 are located on an edge 415, and are offset from each other according to various offset distances similar to the offset distance 213. Additionally, the facets 421-424 are located on an edge 425 and are offset from each according to various offset distances similar to the offset distance 223 which allow for low-loss propagation of each individual optical signal, signals 402-408, while maintaining low-loss propagation for the other signals in the MMI device.

For example, the optical paths 431-434 each have an associated propagation patterns (similar to the propagation patterns in patterns 240 and 250 shown in FIGS. 2B-C), where the various offsets of the facets allow for low-loss propagation in the optical paths 431-434. For example, the MMI region geometry creates a pattern associated with the optical path 431 that minimizes loss for this path, but also does not interfere with the optical signals 432-434. The geometry of the edges 415 and 425 may be adjusted within areas of no light energy associated with the other patterns in order to minimize alteration of the other patterns in the MMI, such that the four or more optical signals, signals 402-408 may cross within a single optical plane of the device 400. While shown with waveguides crossing in FIG. 4, a plurality of additional waveguides may also be crossed using an MMI device 410, with a single start edge, edge 415, and single end edge, edge 425. Additionally, four or more waveguides may also be crossed using an overlaid MMI device as described in relation to FIG. 5.

Figure 5:
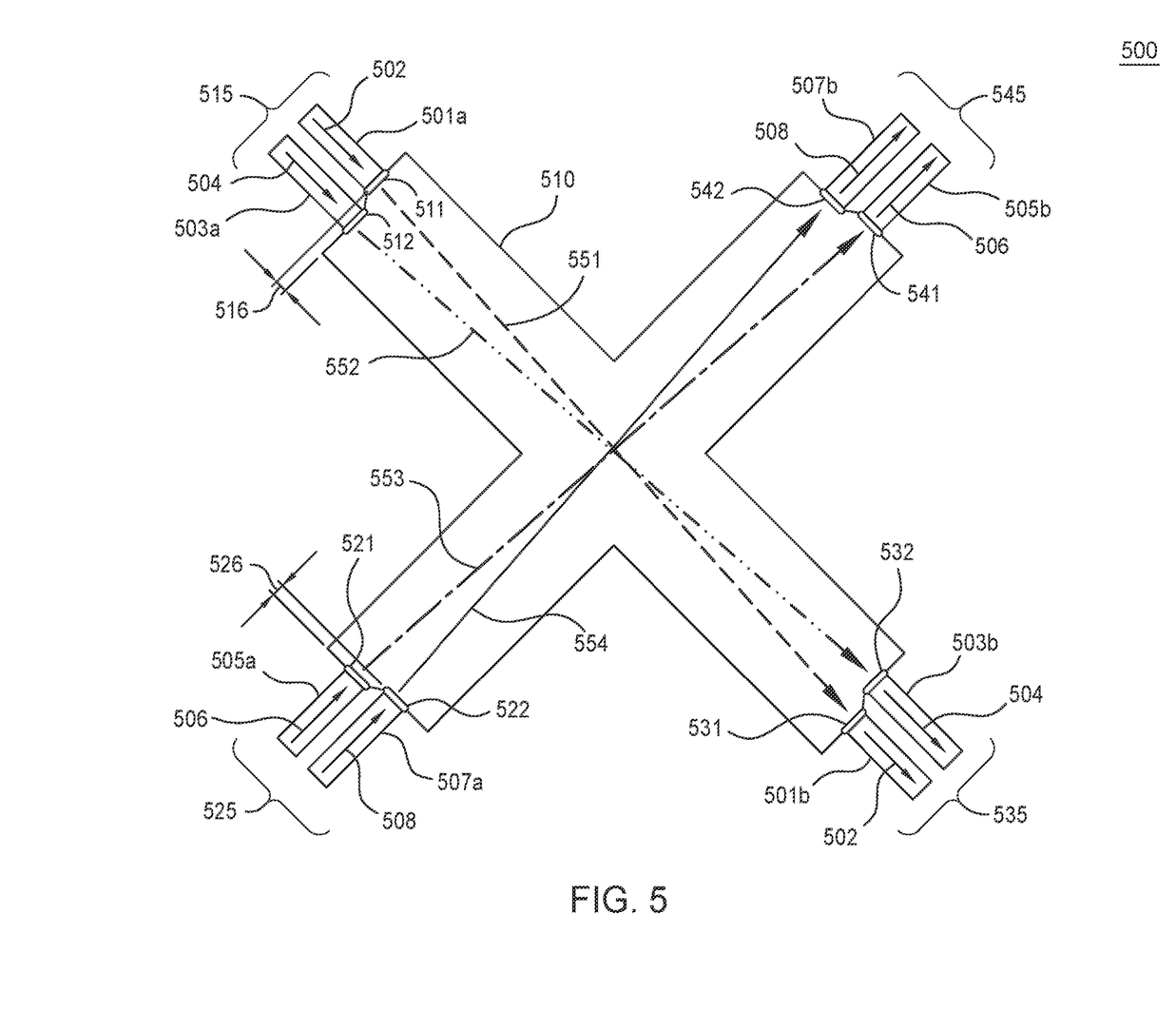
FIG. 5 illustrates an overlaid MMI device, according to one embodiment.

FIG. 5 illustrates an overlaid MMI device, MMI device 510, according to one embodiment. In some examples, an optical device 500 include four waveguides that are to cross including waveguides 501a-507a. The waveguides 501a-503a are located in a first position on the optical device 500 and the waveguides 505a-507a are located at a second position on the optical device 500 such that a single edged MMI device cannot be used without additional or unnecessary waveguide routing.

In some examples, the MMI device 510 includes two 2×2 MMI devices, such as those described in FIGS. 2A-C, overlaid on top of each other in order to provide a 4×4 MMI device. The MMI device 510 includes a first start facet, facet 511 on a first edge of an MMI device, edge 515, and a first end facet, facet 531, on a second edge, of the MMI device, edge 535.

The MMI device 510 also includes a second start facet, facet 512, on the edge 515 and a second end facet, facet 532, on the edge 535. The MMI device 510 also includes third start facet, facet 521 on a third edge of the MMI device, edge 525, and a third end facet, facet 541, on a fourth edge of the MMI device, edge 545. The MMI device 510 may also include a fourth start facet, facet 522, on the edge 525 and a fourth end facet, facet 542, on the edge 545.

In some examples, the MMI device 510 includes a first optical path, path 551, through the MMI device which includes a first propagation pattern through the MMI device from the first start facet, facet 511, to the first end facet, facet 521. The MMI device 510 may also include a second optical path, path 552, through the MMI device which includes a second propagation pattern through the MMI device from the second start facet, facet 512, to the second end facet, facet 522.

The MMI device 510 also includes a third optical path, path 553, through the MMI device with a third propagation pattern through the MMI device from the third start facet, facet 521 to the third end facet, facet 541. The MMI device 510 also includes a fourth optical path, path 554, through the MMI device which includes a fourth propagation pattern through the MMI device from the fourth start facet, facet 522, to the fourth end facet, facet 542.

In some examples, the MMI device 510 includes two 2×2 rectangular MMI devices where the edges of the rectangular MMI devices are not offset. For example, the edges 515, 535, 525, and 545 are flush or otherwise not offset. In this example, an offset distance 516 on the edge 515 between the facets 511 and 512 is zero. Similarly, an offset distance 526 on the edge 525 between the facets 521 and 522 is also zero.

The edges 535 and 545 are similarly offset to the respective edges, edges 515 and 525. In this example, the MMI device 510 provides waveguide crossing for optical signals with the same optical channel or wavelength. For examples, the paths 551 and 552 may include optical signals with the same wavelength and paths 553 and 554 may include optical signals with the same wavelength. In some examples, the two 2×2 rectangular MMI devices may also have different lengths such that the distance between the edges on each overlaid MMI is different.

In another example, the second start facet, facet 512, is offset from the first start facet, facet 511, on the first edge, edge 515, by the offset distance 516. Additionally, the second end facet, facet 532, may be offset from the first end facet, facet 531, on the second edge, edge 535 by the offset distance 516. In some examples, the fourth start facet, facet 522, is offset from the third start facet, facet 521, by the offset distance 526, on the third edge, edge 525. Additionally, the fourth end facet, facet 542, is offset from the third end facet, 542, on the fourth edge, edge 545 by the offset distance 526.

The various offset distances between the various facets, facets 511, 512, 531, and 532 provide the first optical path, path 551 with a first propagation pattern for optical signals with a first transmission wavelength and the second optical path, path 552, with a second propagation pattern for optical signals with a second transmission wavelength, where the second transmission wavelength is different from the first transmission wavelength.

Additionally, the offset distances between the various facets, facets 521, 522, 541, and 542 provide the third optical path, path 553 with a third propagation pattern for optical signals with a third transmission wavelength and the fourth optical path, path 554, with a fourth propagation pattern with a fourth transmission wavelength. In some examples, the fourth transmission wavelength is different from the third transmission wavelength in manner similar to the MMI device discussed in relation to FIGS. 2A-2C.

In some examples, the first propagation pattern associated with the path 551 minimizes signal loss for a first wavelength, while the facet offsets create a different pattern associated with path 552 minimizing optical signal loss for a second wavelength. Additionally, the third propagation pattern associated with the path 553 minimizes signal loss for a third wavelength, while the facet offsets create a different pattern associated with path 554 minimizing optical signal loss for a fourth wavelength.

Additionally, the MMI device 510 may also be embedded within a photonic device, e.g. the optical device 500, which includes a first waveguide 501a optically coupled to the first start facet, facet 511, a second waveguide 503a optically coupled to the second start facet, facet 512, a third waveguide 505a optically coupled to the third start facet, facet 521, and a fourth waveguide 507a optically coupled to the fourth start facet, facet 522.

The optical device 500 may also include a fifth waveguide, 501b, optically coupled to the first end facet, facet 531, a sixth waveguide 503b optically coupled to the second end facet, facet 532, a seventh waveguide 505b optically coupled to the third end facet, facet 541, and an eighth waveguide 507b optically coupled to the fourth end facet, facet 542.

In some examples, the MMI device 510 provide waveguide crossing where the first waveguide 501a transmits a first optical signal 502 to the fifth waveguide 501b, and the second waveguide 503a transmits a second optical signal 504 to the sixth waveguide 503b. Furthermore, the third waveguide 505a transmits a third optical signal 506 to the seventh waveguide 505b, and the fourth waveguide, 507a transmits a fourth optical signal 508 to the eighth waveguide 507b via the MMI device 510.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart illustrations and block diagrams in the Figures Illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A multimode interference (MMI) device comprising:
a first start facet on a first edge of an MMI device;
a first end facet on a second edge of the MMI device;
a first optical path through the MMI device from the first start facet to the first end facet;
a second start facet on the first edge, wherein the second start facet is offset from the first start facet on the first edge;
a second end facet on the second edge, wherein the second end facet is offset from the first end facet on the second edge; and
a second optical path through the MMI device from the second start facet to the second end facet.

2. The MMI device of claim 1, wherein the first optical path transmits a first optical signal comprising a first transmission wavelength; and
wherein the second optical path transmits a second optical signal comprising a second transmission wavelength, wherein the second transmission wavelength is different from the first transmission wavelength.

3. The MMI device of claim 1, wherein the second start facet and the second end facet are offset to minimize optical loss in the second optical path.

4. The MMI device of claim 1, wherein the first optical path through the MMI device comprises a first propagation pattern comprising:
a first region without light energy on the first edge of the MMI device adjacent to the second start facet; and
a second region without light energy on the second edge of the MMI device adjacent to the second end facet; and
wherein the second optical path through the MMI device comprises a second propagation pattern comprising:
a third region without light energy on the first edge of the MMI device adjacent to the first start facet; and
a fourth region without light energy on the second edge of the MMI device adjacent to the first end facet.

5. The MMI device of claim 1, wherein the MMI device provides a planar waveguide crossing via the first optical path and the second optical path.

6. The MMI device of claim 1, further comprising:
one or more additional start facets on the first edge of the MMI device wherein the one or more additional start facets are offset from at least the first start facet and the second start facet on the first edge;
one or more additional end facets on the second edge of the MMI device, wherein the one or more additional end facets are offset from at least the first end facet and the second end facet on the second edge; and
one or more additional optical paths through the MMI device from respective one or more additional start facets to respective one or more additional end facets.

7. The MMI device of claim 1, the MMI device further comprising:
a third start facet on a third edge of the MMI device;
a third end facet on a fourth edge of the MMI device;
a third optical path through the MMI device from the third start facet to the third end facet;
a fourth start facet on the third edge, wherein the fourth start facet is offset from the third start facet on the third edge;
a fourth end facet on the fourth edge, wherein the fourth end facet is offset from the third end facet on the fourth edge; and
a fourth optical path through the MMI device from the fourth start facet to the fourth end facet.

8. The MMI device of claim 1, wherein the MMI device is embedded within a photonic device, wherein the photonic device comprises:
a first waveguide optically coupled to the first start facet;
a second waveguide optically coupled to the second start facet;
a third waveguide optically coupled to the first end facet; and
a fourth waveguide optically coupled to the second end facet;
wherein the first waveguide transmits a first optical signal to the third waveguide via the MMI device; and
wherein the second waveguide transmits a second optical signal to the fourth waveguide via the MMI device.

9. A photonic circuit device with multimode inference (MMI) waveguide crossing comprising:
a first waveguide transmitting a first optical signal comprising a first transmission wavelength;
a second waveguide transmitting a second optical signal comprising a second transmission wavelength different than the first transmission wavelength;
a waveguide crossing MMI device for the first waveguide and the second waveguide comprising:
a first start facet optically connected to the first waveguide on a first edge of the waveguide crossing MMI device;
a first end facet on a second edge of the waveguide crossing MMI device;
a first optical path through the waveguide crossing MMI device from the first start facet to the first end facet for the first optical signal;
a second start facet optically connected to the second waveguide on the first edge, wherein the second start facet is offset from the first start facet on the first edge;
a second end facet on the second edge, wherein the second end facet is offset from the first end facet on the second edge; and
a second optical path through the waveguide crossing MMI device from the second start facet to the second end facet for the second optical signal.

10. The photonic circuit device of claim 9, wherein the second start facet and the second end facet are offset to minimize optical loss in the second optical path.

11. The photonic circuit device of claim 9, wherein the first optical path through the waveguide crossing MMI device comprises a first propagation pattern comprising:
a first region without light energy on the first edge of the waveguide crossing MMI device adjacent to the second start facet; and
a second region without light energy on the second edge of the waveguide crossing MMI device adjacent to the second end facet; and
wherein the second optical path through the waveguide crossing MMI device comprises a second propagation pattern comprising:
a third region without light energy on the first edge of the waveguide crossing MMI device adjacent to the first start facet; and
a fourth region without light energy on the second edge of the waveguide crossing MMI device adjacent to the first end facet.

12. The photonic circuit device of claim 9, wherein the waveguide crossing MMI device provides a planar waveguide crossing via the first optical path and the second optical path.

13. The photonic circuit device of claim 9, wherein the waveguide crossing MMI device further comprises:
one or more additional start facets on the first edge of the waveguide crossing MMI device wherein the one or more additional start facets are offset from at least the first start facet or the second start facet on the first edge;
one or more additional end facets on the second edge of the waveguide crossing MMI device, wherein the one or more additional end facets are offset from at least the first end facet or the second end facet on the second edge; and
one or more additional optical paths through the waveguide crossing MMI device from respective one or more additional start facets to respective one or more additional end facets.

14. The photonic circuit device of claim 9, further comprising:
- a third waveguide optically connected to the first end facet, wherein the third waveguide transmits a third optical signal comprising the first transmission wavelength; and
- a fourth waveguide optically connected the second end facet, wherein the fourth waveguide transmits a fourth optical signal comprising the second transmission wavelength.

15. The photonic circuit device of claim 9, further comprising:
- a third waveguide transmitting a third optical signal comprising a third transmission wavelength;
- a fourth waveguide transmitting a fourth optical signal comprising a fourth transmission wavelength; and
- wherein the waveguide crossing MMI device further comprises:
  - a third start facet optically connected to the third waveguide on a third edge of the waveguide crossing MMI device;
  - a third end facet on a fourth edge of the waveguide crossing MMI device;
  - a third optical path through the waveguide crossing MMI device from the third start facet to the third end facet;
  - a fourth start facet on the third edge, wherein the fourth start facet is offset from the third start facet on the third edge;
  - a fourth end facet on the fourth edge, wherein the fourth end facet is offset from the third end facet on the fourth edge; and
  - a fourth optical path through the waveguide crossing MMI device from the fourth start facet to the fourth end facet.

16. A multimode interference (MMI) device comprising:
a first start facet on a first edge of an MMI device;
a first end facet on a second edge of the MMI device;
a second start facet on the first edge;
a second end facet on the second edge;
a third start facet on a third edge of the MMI device;
a third end facet on a fourth edge of the MMI device;
a fourth start facet on the third edge;
a fourth end facet on the fourth edge;
a first optical path through the MMI device from the first start facet to the first end facet; and
a second optical path through the MMI device from the second start facet to the second end facet;
a third optical path through the MMI device from the third start facet to the third end facet; and
a fourth optical path through the MMI device from the fourth start facet to the fourth end facet.

17. The MMI device of claim 16, wherein at least one of:
the second start facet is offset from the first start facet on the first edge,
the second end facet is offset from the first end facet on the second edge,
the fourth start facet is offset from the third start facet on the third edge, and
the fourth end facet is offset from the third end facet on the fourth edge.

18. The MMI device of claim 17,
wherein the first optical path transmits a first optical signal comprising a first transmission wavelength,
wherein the second optical path transmits a second optical signal comprising a second transmission wavelength,
wherein the second transmission wavelength is different from the first transmission wavelength,
wherein the third optical path a third optical signal comprising transmits a third transmission wavelength,
wherein the fourth optical path a fourth optical signal comprising transmits a fourth transmission wavelength,
wherein the fourth transmission wavelength is different from the third transmission wavelength.

19. The MMI device of claim 16, wherein the MMI device is embedded within a photonic device, wherein the photonic device comprises:
a first waveguide optically coupled to the first start facet;
a second waveguide optically coupled to the second start facet;
a third waveguide optically coupled to the third start facet;
a fourth waveguide optically coupled to the fourth start facet;
a fifth waveguide optically coupled to the first end facet; and
a sixth waveguide optically coupled to the second end facet;
a seventh waveguide optically coupled to the third end facet; and
an eighth waveguide optically coupled to the fourth end facet;
wherein the first waveguide transmits a first optical signal to the fifth waveguide via the MMI device;
wherein the second waveguide transmits a second optical signal to the sixth waveguide via the MMI device;
wherein the third waveguide transmits a third optical signal to the seventh waveguide via the MMI device; and
wherein the fourth waveguide transmits a fourth optical signal to the eighth waveguide via the MMI device.

20. The MMI device of claim 16,
wherein at least one of:
the second start facet and the second end facet are offset to minimize optical loss in the first optical path and the second optical path, and
the fourth start facet and the fourth end facet are offset to minimize optical loss in the third optical path and the fourth optical path.

* * * * *